US008891258B2

(12) United States Patent
Zhang et al.

(10) Patent No.: US 8,891,258 B2
(45) Date of Patent: Nov. 18, 2014

(54) SWITCH MODE POWER SUPPLY AND CONTROL METHOD THEREOF

(75) Inventors: Yongliang Zhang, Hangzhou (CN); Xiaoyu Xi, Chengdu (CN); Jiali Cai, Hangzhou (CN)

(73) Assignee: Monolithic Power Systems, Inc, San Jose, CA (US)

( * ) Notice: Subject to any disclaimer, the term of this patent is extended or adjusted under 35 U.S.C. 154(b) by 274 days.

(21) Appl. No.: 13/468,706

(22) Filed: May 10, 2012

(65) Prior Publication Data
US 2012/0287682 A1 Nov. 15, 2012

(30) Foreign Application Priority Data
May 10, 2011 (CN) .......................... 2011 1 0119759

(51) Int. Cl.
*H02M 3/335* (2006.01)
*H05B 33/08* (2006.01)

(52) U.S. Cl.
CPC ....... *H02M 3/33507* (2013.01); *H05B 33/0815* (2013.01)
USPC ...................................................... 363/21.12

(58) Field of Classification Search
CPC .............................................. H02M 2001/0009
USPC ............................................ 363/21.12–21.18
See application file for complete search history.

(56) References Cited

U.S. PATENT DOCUMENTS

| 7,098,632 | B2 * | 8/2006 | Chen et al. ..................... 323/222 |
| 8,120,931 | B2 * | 2/2012 | Chang et al. ............... 363/21.07 |
| 8,625,309 | B2 * | 1/2014 | Kawamura ................. 363/21.01 |
| 8,670,255 | B2 * | 3/2014 | Gong et al. ..................... 363/89 |
| 2010/0201335 | A1 | 8/2010 | Li et al. |
| 2011/0228570 | A1 | 9/2011 | Li et al. |

* cited by examiner

*Primary Examiner* — Harry Behm
(74) *Attorney, Agent, or Firm* — Perkins Coie LLP (57) ABSTRACT

In one embodiment, a switch mode power supply comprising a switch and a control circuit is disclosed. The control circuit may comprise a multi-function pin configured to receive a first current sampling signal and a first voltage sampling signal. A first comparing signal may be provided by comparing the first voltage sampling signal with a first threshold signal when the switch is turned OFF, and a second comparing signal may be provided by comparing the first current sampling signal with a second threshold signal when the switch is turned ON. The control circuit may be configured to control the switch in accordance with the first comparing signal and the second comparing signal.

19 Claims, 4 Drawing Sheets

SWITCH MODE POWER SUPPLY AND CONTROL METHOD THEREOF

CROSS-REFERENCE TO RELATED APPLICATION(S)

This application claims the benefit of CN Application No. 201110119759.8, filed on May 10, 2011, and incorporated herein by reference.

TECHNICAL FIELD

This invention relates generally to electrical circuits, and more particularly but not exclusively to switch mode power supply.

BACKGROUND

Many electronic devices require a direct current (DC) voltage power supply, such as light-emitting diodes (LEDs). Generally, switch mode power supplies are employed to provide the DC voltage in different applications. In most applications of switch mode power supply, a transformer or an inductor is employed as an energy storage component. For example, a transformer is employed as the energy storage element in a flyback converter, and a switch of the flyback converter is coupled to a primary winding of the transformer. A control circuit is employed to turn ON or turn OFF the switch, the transformer is configured to store energy or output energy to a secondary winding of the transformer alternately, and then the light-emitting diodes are driven.

Figure 1:
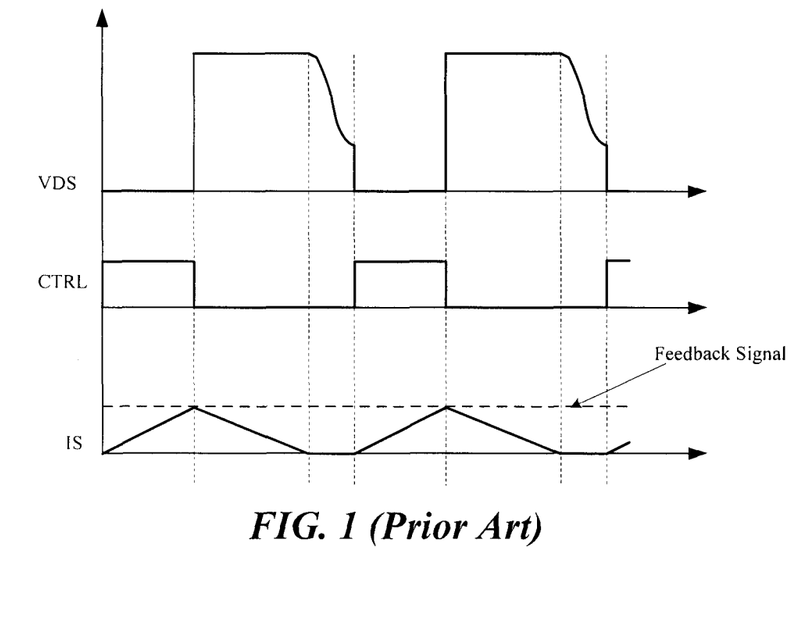
FIG. 1 shows waveforms illustrating signals of traditional switch mode power supply with quasi-resonant control.

Fixed frequency control and varied frequency control are two main control strategies for switch mode power supply. Quasi-resonant (QR) control is widely used as one of the varied frequency control. FIG. 1 shows waveforms illustrating signals of traditional switch mode power supply with quasi-resonant control. As shown in FIG. 1, the switch mode power supply works in boundary conduction mode, and an energy storage component is resonant with a parasitic capacitance of a switch when a current IS flowing through the energy storage component is decreased to about zero. The switch is turned ON when a drain-source voltage VDS across the switch is almost at its minimum value (i.e., valley turn-on), as a result the switch loss is small. The switch is turned OFF to regulate an output of the switch mode power supply when a current flowing through the switch is increased larger than a feedback signal indicating output voltage/output current/output power.

Traditionally, the switch mode power supply comprises an integrated circuit (IC) as its control circuit. The control IC comprises a first pin coupled to a current sampling signal indicating the current flowing through the switch and a second pin coupled to a voltage sampling signal indicating a voltage across the switch. The control IC is configured to turn OFF the switch when the current sampling signal is larger than the feedback signal and the control IC is configured to turn ON the switch when the voltage sampling signal is less than a threshold signal.

The control IC may have a cycle by cycle current limit to avoid an over-current breakdown of the switch. The current sampling signal is compared with an over-current threshold during each switching period. When the current sampling signal is larger than the over-current threshold signal, the control IC is configured to provide an over-current protection, e.g., turning OFF the switch until the control IC restarts.

For traditional switch mode power supply, the over-current threshold signal is integrated onto the control IC and is non-adjustable, while the current sampling signal has to be constant per an anticipated output voltage/current/power of the switch mode power supply. Thus, a switch mode power supply with a flexible current protection is needed.

The control IC may comprise a leading edge blanking (LEB) unit to avoid turning OFF the switch by mistake when the switch is turned ON and the parasitic capacitance of the switch is discharging rapidly. During a LEB period, e.g., 200-300 ns, the current sampling signal is not effect for protecting. But the switch may be broken down because of a non-detection of a potential over-current during the LEB period.

SUMMARY

In one embodiment, a switch mode power supply comprising a first switch, an energy storage component, a first current sampling circuit, a first voltage sampling circuit and a control circuit is disclosed. The energy storage component may be coupled to the first switch. The energy storage component may be configured to store energy when the first switch is turned ON and the energy storage component may be configured to output energy when the first switch is turned OFF. The first current sampling circuit may be coupled to the first switch and may be configured to provide a first current sampling signal indicating a current flowing through the first switch. The first voltage sampling circuit may be configured to provide a first voltage sampling signal indicating a voltage across the first switch. The control circuit may comprise an output terminal coupled to a control terminal (Gate) of the first switch to provide a control signal. The control circuit may comprise a multi-function pin configured to receive the first current sampling signal and the first voltage sampling signal. The control circuit may be configured to compare a signal on the multi-function pin with a first threshold signal when the first switch is turned OFF, and be configured to compare the signal on the multi-function pin with a second threshold when the first switch is turned ON, and then the control circuit may be configured to control the first switch accordingly.

In one embodiment, a switch mode power supply comprising a first switch, an energy storage component, a first current sampling circuit, a second current sampling circuit, a first voltage sampling circuit, and a control circuit is disclosed. The energy storage component may be coupled to the first switch. The energy storage component may be configured to store energy when the first switch is turned ON and the energy storage component may be configured to output energy when the first switch is turned OFF. The first current sampling circuit may be coupled to the first switch and may be configured to provide a first current sampling signal indicating a current flowing through the first switch. The second current sampling circuit may be configured to provide a second current sampling signal indicating the current flowing through the first switch. The first voltage sampling circuit may be configured to provide a first voltage sampling signal indicating a voltage across the first switch. The control circuit may comprise a multi-function pin configured to receive the first current sampling signal and the first voltage sampling signal. The control circuit may comprise a first comparison circuit, a second comparison circuit, a third comparison circuit, a second switch, and a logic circuit. The first comparison circuit may comprise a first input terminal coupled to the multi-function pin, a second input terminal configured to receive a first threshold signal, and an output terminal. The second comparison circuit may comprise a first input terminal, a second input terminal configured to receive a second threshold signal and an output terminal. The third comparison circuit may be coupled to the second current sampling circuit and may be configured to compare the second current sampling signal with a third threshold signal. The second switch may comprise a first terminal coupled to the multi-function pin, a second terminal coupled to the first input terminal of the second comparison circuit, and a control terminal. The logic circuit may comprise an output terminal coupled to a control terminal of the first switch. The logic circuit may be coupled to the control terminal of the second switch, the output terminal of the first comparison circuit, the output terminal of the second comparison circuit, and the output terminal of the third comparison circuit. The first switch and the second switch may be turned ON when the first voltage sampling signal is less than the first threshold signal, and the first switch and the second switch may be turned OFF when the second current sampling signal is larger than the third threshold signal. The logic circuit is configured to provide an over-current protection when the first current sampling signal is larger than the second threshold signal.

In one embodiment, a control circuit for a switch mode power supply is disclosed. The control circuit may comprise a multi-function pin configured to receive a first current sampling signal and a first voltage sampling signal. The control circuit may comprise a first comparison circuit, a second comparison circuit, a signal transmission circuit, and a logic circuit. The first comparison circuit may comprise a first input terminal, a second input terminal configured to receive a first threshold signal and an output terminal. The second comparison circuit may comprise a first input terminal, a second input terminal configured to receive a second threshold signal and an output terminal. The signal transmission circuit may be coupled to the multi-function pin, the first input terminal of the first comparison circuit and the first input terminal of the second comparison circuit. The first input terminal of the second comparison circuit may be configured to receive a signal on the multi-function pin when the first switch is turned ON. The first input terminal of the first comparison circuit may be configured to receive the signal on the multi-function pin when the first switch is turned OFF. The logic circuit may be coupled to the output terminal of the first comparison circuit and the output terminal of the second comparison circuit, and may provide a control signal configured to turn ON or turn OFF the first switch.

In one embodiment, a control method for a switch mode power supply is disclosed. A first stage of the control method may comprise providing a first current sampling signal indicating a current flowing through a first switch. A second stage of the control method may comprise providing a first voltage sampling signal indicating a voltage across the first switch. A third stage of the control method may comprise receiving the first current sampling signal and the first voltage sampling signal via a multi-function pin. A fourth stage of the control method may comprise comparing a signal on the multi-function pin with a first threshold signal when the first switch is turned OFF, and comparing the signal on the multi-function pin with a second threshold signal when the first switch is turned ON. A fifth stage of the control method may comprise controlling the first switch in accordance with a comparing result of the fourth stage.

These and other features of the present invention will be readily apparent to persons of ordinary skill in the art upon reading the entirety of this disclosure, which includes the accompanying drawings and claims.

BRIEF DESCRIPTION OF THE DRAWINGS

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Several embodiments of the present invention are described below with reference to switch mode power supply and associated control method. As used hereinafter, the term "couple" generally refers to multiple ways including a direct connection with an electrical conductor and an indirect connection through intermediate diodes, resistors, capacitors, and/or other intermediaries. The term "switch" generally refers to a semiconductor device composed of semiconductor material with at least three terminals for connection to an external circuit. The term "fan-out capability" generally refers to an ability of providing current.

Figure 2:
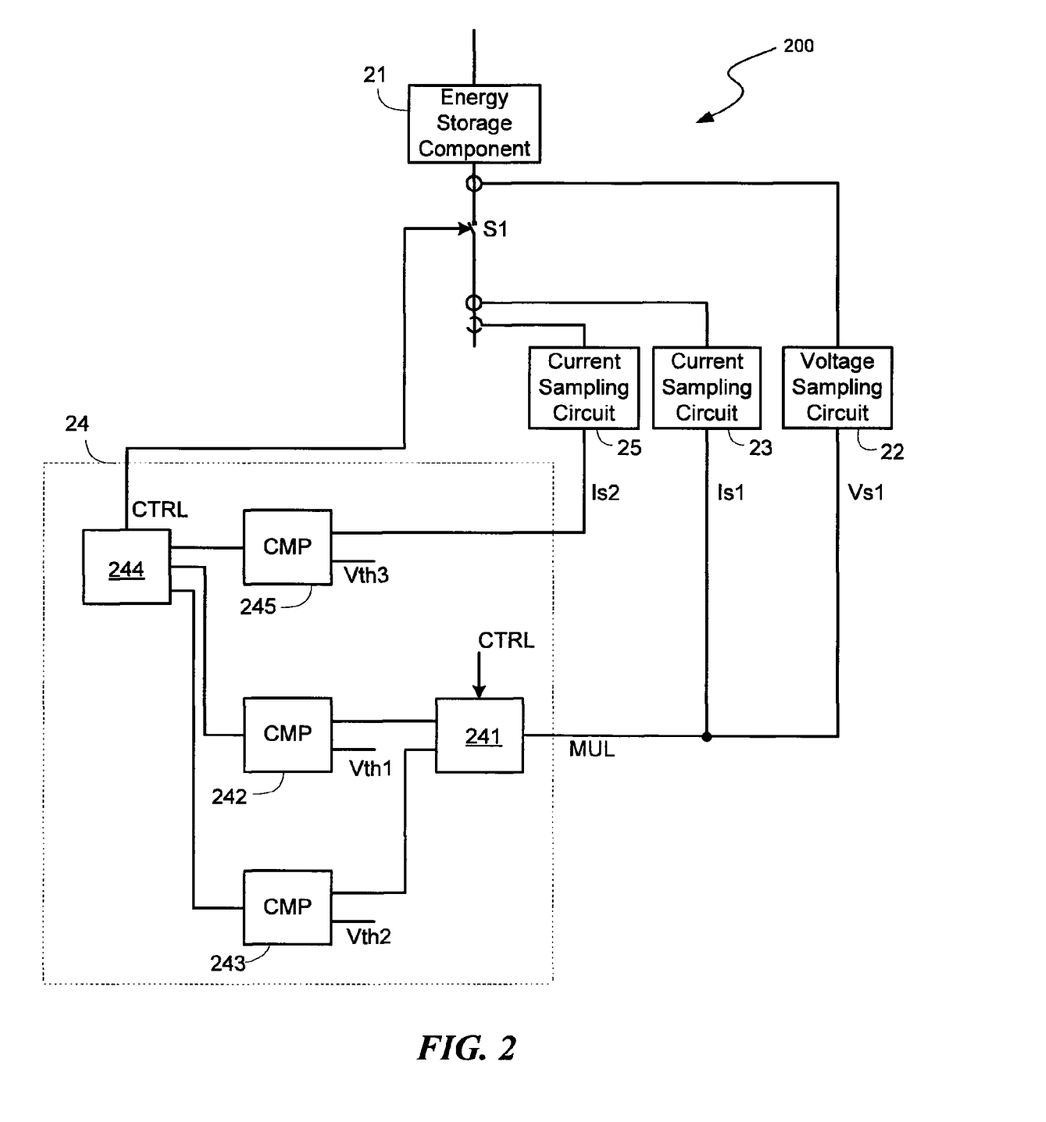
FIG. 2 illustrates a block diagram of a switch mode power supply in accordance with an embodiment of the present invention.

FIG. 2 illustrates a block diagram of a switch mode power supply 200 in accordance with an embodiment of the present invention. Switch mode power supply 200 comprises a switch S1, an energy storage component 21, a voltage sampling circuit 22, a current sampling circuit 23, and a control circuit 24. In one embodiment, switch S1 may be metal-oxide semiconductor field effect transistor (MOSFET), junction field effect transistor (JFET), bipolar junction transistor (BJT), insulated gate bipolar translator (IGBT) or other types of controllable semiconductor switching devices. Energy storage component 21 is coupled to a first terminal (Drain) of switch S1, and is configured to store energy when switch S1 is turned ON and output energy when switch S1 is turned OFF. In one embodiment, energy storage component 21 comprises a transformer. In another embodiment, energy storage component 21 comprises an inductor.

Voltage sampling circuit 22 is configured to provide a voltage sampling signal Vs1 indicating a voltage across switch S1 (VDS). Current sampling circuit 23 is coupled to a second terminal (Source) of switch S1, and is configured to provide a current sampling signal Is1 indicating a current flowing through switch S1 from the first terminal to the second terminal of switch S1.

In one embodiment, control circuit 24 is integrated onto a single IC. Control circuit 24 is coupled to a control terminal (Gate) of switch S1 to provide a control signal CTRL and comprises a multi-function pin MUL. Multi-function pin MUL is coupled to voltage sampling circuit 22 and current sampling circuit 23 to receive voltage sampling signal Vs1 and current sampling signal Is1. Control circuit 24 is configured to compare a signal on multi-function MUL with a threshold signal Vth1 when switch S1 is turned OFF, and compare the signal on multi-function MUL with a threshold signal Vth2 when switch S1 is turned ON, and control circuit 24 is configured to control switch S1 accordingly.

In one embodiment, voltage sampling circuit 22 is coupled to the first terminal (Drain) of switch S1 to sample the voltage across switch S1 (VDS) and is configured to provide voltage sampling signal Vs1. When switch S1 is turned ON, the voltage across switch S1 is small, e.g., 0.3V, and voltage on multi-function pin MUL reflects value of current sampling signal Is1. When switch S1 is turned OFF, current flowing through switch S1 is blocked, and voltage on multi-function pin MUL reflects value of voltage sampling signal Vs1.

In one embodiment, control circuit 24 comprises a signal transmission circuit 241, a comparison circuit 242, a comparison circuit 243, and a logic circuit 244. Comparison circuit 242 comprises a first input terminal, a second input terminal configured to receive threshold signal Vth1 and an output terminal. Comparison circuit 243 comprises a first input terminal, a second input terminal configured to receive threshold signal Vth2, and an output terminal. Signal transmission circuit 241 is coupled to multi-function pin MUL, the first input terminal of comparison circuit 242, and the first input terminal of comparison circuit 243. The signal on multi-function pin MUL is coupled to the first input terminal of comparison circuit 243 when switch S1 is turned ON, and the signal on multi-function pin MUL is coupled to the first input terminal of comparison circuit 242 when switch S1 is turned OFF. Logic circuit 244 is coupled to the control terminal of switch S1 to provide control signal CTRL, and logic circuit 244 is coupled to the output terminal of comparison circuit 242 and the output terminal of comparison circuit 243. Switch S1 is controlled via logic circuit 244 in accordance with a first comparing signal on the output terminal of comparison 242 and second comparing signal on the output terminal of comparison circuit 243.

In one embodiment, when switch S1 is turned OFF, if the signal on multi-function pin MUL is less than threshold signal Vth1, switch S1 is configured to be turned ON. When switch S1 is turned ON, if the signal on multi-function pin MUL is larger than threshold signal Vth2, an over-current protection is provided, e.g., turning OFF switch S1. In one embodiment, signal transmission circuit 241 comprises a first switch and a second switch. Multi-function pin MUL is coupled to the first input terminal of comparison circuit 242 through the first switch, and is coupled to the first input terminal of comparison circuit 243 through the second switch. The first switch and the second switch are switching out of phase in accordance with control signal CTRL.

In one embodiment, switch mode power supply 200 further comprises current sampling circuit 25. Current sampling circuit 25 is coupled to the second terminal of switch S1 and is configured to provide a current sampling signal Is2 indicating the current flowing through switch S1 from the first terminal to the second terminal. Control circuit 24 further comprises a comparison circuit 245 comparing the current sampling signal Is2 with a threshold signal Vth3. Logic circuit 244 is coupled to an output terminal of comparison circuit 245 to provide control signal CTRL and is configured to turn OFF switch 51 when current sampling signal Is2 is larger than threshold signal Vth3.

Current sampling circuit 23 and/or current sampling circuit 25 may comprise resistor divider, transformer, current amplifier or any other circuit appropriate. Threshold signal Vth3 compared with current sampling signal Is2 may be proportional to an output voltage/current/power of switch mode power supply 200 to regulate the output of switch mode power supply 200.

Current sampling circuit 23 may be independent from current sampling signal 25, and current sampling signal Is1 is provided via current sampling circuit 23 for over-current protection. Threshold signal Vth2 representing value of an over-current threshold may be adjustable per external independent sampling circuit, e.g., different resistor divider setting may introduce different over-current threshold.

Cost of control circuit 24 integrated onto an integrated circuit may be decreased and a printed circuit board (PCB) size may be reduced per Multi-function pin employed in control circuit 24. In one embodiment, the signal on multi-function pin is configured to compare with threshold signal Vth1 or threshold signal Vth2 without any LEB unit, and then over-current protection is provided without any blanking period.

Figure 3:
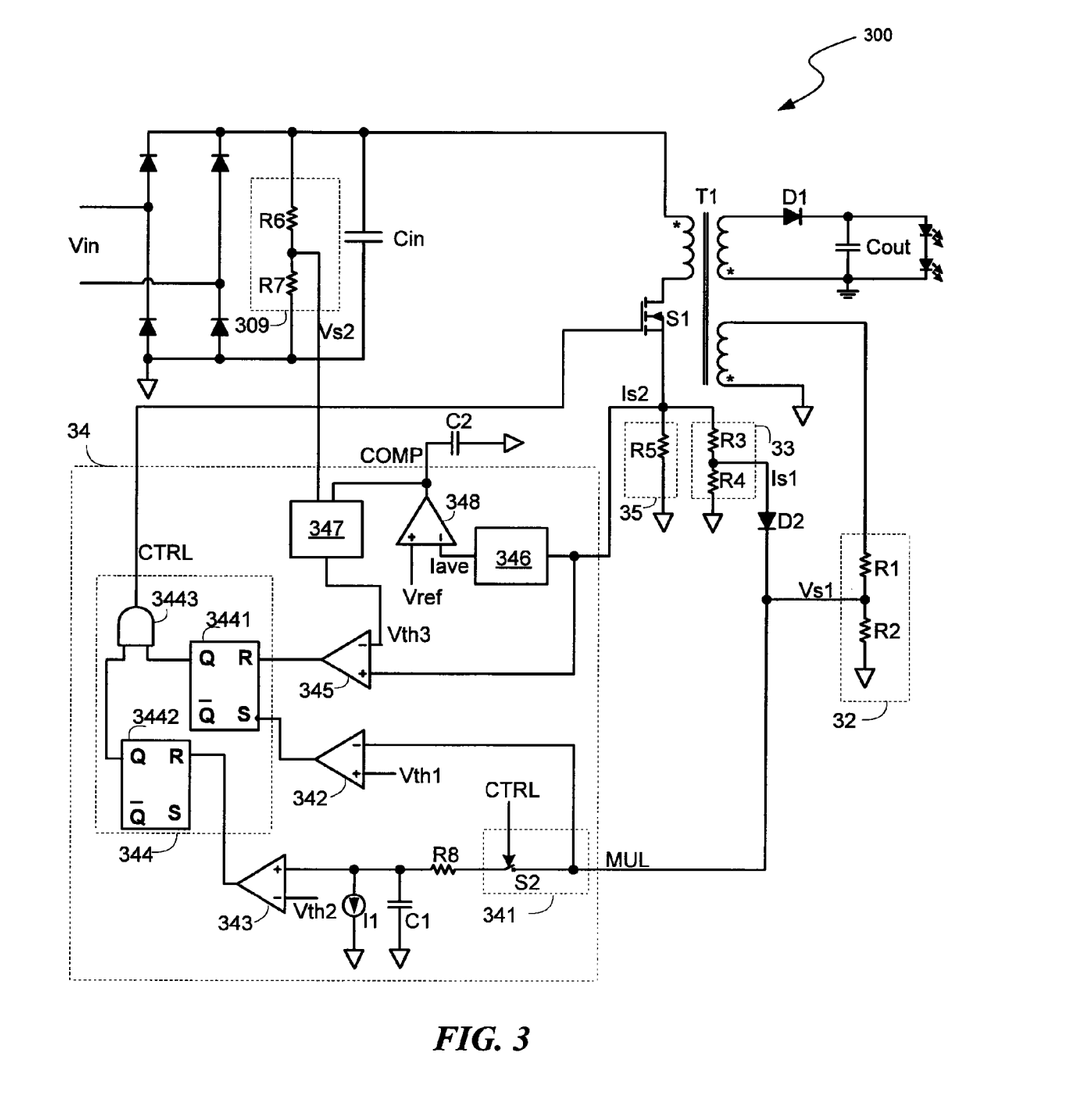
FIG. 3 schematically illustrates a switch mode power supply in accordance with an embodiment of the present invention.

FIG. 3 schematically illustrates a switch mode power supply 300 in accordance with an embodiment of the present invention. As shown in FIG. 3, a flyback topology is illustrated as one example. One of ordinary skill in the art will note that any other topologies, e.g., step-down (BUCK), step-up (BOOST), Step-Up/Step-Down (BUCK-BOOST), forward and so on, may be employed without detracting from the spirit of the present invention.

In one embodiment, switch mode power supply 300 is employed to drive LEDs. Switch mode power supply 300 may comprise a rectified circuit, an input capacitor Cin, a transformer T1, a switch S1, a diode D1, an output capacitor Cout, a voltage sampling circuit 32, a current sampling circuit 33 and a current sampling circuit 35. In one embodiment, the rectified circuit comprises a bridge rectifier.

The bridge rectifier comprises an input terminal configured to receive an input signal Vin, and an output terminal configured to provide an uncontrollable rectified input signal. Input capacitor Cin is coupled to the output terminal of the bridge rectifier. Transformer T1 comprises a primary winding, a secondary winding and an auxiliary winding. A first terminal of input capacitor Cin is coupled to a first terminal of the primary winding, and a second terminal of input capacitor Cin is coupled to a system ground. In one embodiment as shown in FIG. 3, switch S1 is an N type MOSFET (NMOS). One of ordinary skill in the art will note that P type MOSFET may also be used as switch S1 without detracting from the merits of the present invention. Switch S1 is coupled between a second terminal of the primary winding and the system ground. Diode D1 comprises an anode coupled to a first terminal of the secondary winding and a cathode coupled to a first terminal of output capacitor Cout. A second terminal of output capacitor Cout is coupled to a second terminal of the secondary winding. The LEDs are coupled between the first terminal and the second terminal of output capacitor Cout as shown in FIG. 3. In one embodiment, diode D1 may be substituted by a synchronous rectifier.

Voltage sampling circuit 32 is coupled to the auxiliary winding and is configured to provide a voltage sampling signal Vs1 via sampling a voltage across the auxiliary winding. In one embodiment, voltage sampling circuit 32 comprises a resistor divider comprising a resistor R1 and a resistor R2.

Current sampling circuit 33 is coupled between a Source terminal of switch S1 and the system ground and is configured to provide a current sampling signal Is1 indicating current flowing through switch S1. In one embodiment, current sampling circuit 33 comprises a resistor divider comprising a resistor R3 and a resistor R4. Current sampling circuit 35 is coupled between the Source terminal of switch S1 and the system ground and is configured to provide current sampling signal Is2 indicating current flowing through switch S1. In one embodiment, current sampling circuit 35 comprises a resistor R5.

In one embodiment, control circuit 34 is integrated onto a single IC. Control circuit 34 is coupled to a Gate terminal of switch S1 to provide a control signal CTRL and comprises a multi-function pin MUL. Multi-function pin MUL is coupled to voltage sampling circuit 32 to receive the voltage sampling signal Vs1 and current sampling circuit 33 to receive the current sampling signal Is1. Control circuit 34 comprises a signal transmission circuit 341, a comparison circuit 342, a comparison circuit 343, a logic circuit 344 and a comparison circuit 345.

Comparison circuit 342 comprises a comparator CMP1 comprising a non-inverting terminal configured to receive a threshold signal Vth1, an inverting terminal coupled to multi-function pin MUL, and an output terminal. In one embodiment, threshold signal Vth1 is about 0.35V. Signal transmission circuit 341 comprises a switch S2. Switch S2 comprises a first terminal coupled to multi-function pin MUL, a second terminal and a control terminal. Comparison circuit 343 comprises a comparator CMP2 comprising a non-inverting terminal coupled to the second terminal of switch S2, an inverting terminal configured to receive a threshold signal Vth2, and an output terminal. Comparison circuit 345 comprises a comparator CMP3 comprising a non-inverting terminal coupled to current sampling circuit 35 to receive current sampling signal Is2, an inverting terminal configured to receive a threshold signal Vth3, and an output terminal. In one embodiment, threshold signal Vth3 is responsive to a current flowing through the LEDs.

Logic circuit 344 comprises a reset-set (RS) flip-flop 3441, a RS flip-flop 3442, and an AND gate 3443. Flip-flop 3441 comprises a SET terminal coupled to the output terminal of comparator CMP1, a RESET terminal coupled to the output terminal of comparator CMP3, and an output terminal. Flip-flop 3442 comprises a RESET terminal coupled to the output terminal of comparator CMP2 and an output terminal. AND gate 3443 comprises a first input terminal coupled to the output of flip-flop 3441, a second input terminal coupled to the output of flip-flop 3442 and an output terminal coupled to the Gate of switch S1 and the control terminal of switch S2. An initial value of the output terminal of Flip-flop 3442 is logic HIGH.

A fan-out capability of current sampling circuit 33 should be much larger than a fan-out capability of voltage sampling circuit 32 (e.g., more than 10 times), a signal on the multi-function pin MUL may mainly reflect current sampling signal Is1 when switch S1 is turned ON. Resistance of resistors R1-R4 may be set to meet the fan-out capability requirement, e.g., resistance of resistor R3 and resistor R4 in parallel may be far less than the resistance of resistor R1 and resistor R2 in parallel. In one embodiment, resistance of resistor R1 and resistor R2 are kilo ohms, resistance of resistor R3 and resistor R4 are thousand ohms, resistance of resistor R5 is ohms. An over-current protection point may be adjusted by adjusting resistance of resistor R3 and resistor R4.

In one embodiment, control circuit 34 comprises independent pins coupled to voltage sampling circuit 32 and current sampling circuit 33 if an integrated circuit for control circuit 34 permitted. Control circuit 34 may be coupled to the Gate of switch S1, current sampling circuit 33, current sampling circuit 35 and voltage sampling circuit 32. Switch S1 is turned ON when voltage sampling signal Vs1 is less than threshold signal Vth1, and switch S1 is turned OFF when current sampling signal Is2 is larger than threshold signal Vth3. An over-current protection is provided when current sampling signal Is1 is larger than threshold signal Vth2.

When switch S1 is turned ON, transformer T1 is configured to store energy, the current flowing through switch S1 from the Drain terminal to the Source terminal increases gradually, thus current sampling signal Is1 and current sampling signal Is2 increase gradually, and voltage sampling signal Vs1 is almost negative. When switch S1 is turned on, switch S2 is configured to be turned ON, and thus the signal on multi-function pin MUL is passed to comparison circuit 343, and comparison circuit 342 would have no influence to provide control signal CTRL. A signal on the output terminal of flip-flop 3441 maintains HIGH until current sampling signal Is2 increasing larger than threshold signal Vth3, no matter comparator CMP1 outputting HIGH or LOW.

When current sampling signal Is2 increases to larger than threshold signal Vth3, comparator CMP3 outputs HIGH to reset flip-flop 3441. Then AND gate 3443 outputs LOW to turn OFF switch S1 and switch S2. When current sampling signal Is1 increases to larger than threshold signal Vth2, it is indicated an over-current condition. In one embodiment, comparator CMP2 outputs HIGH to reset flip-flop 3442. Then AND gate 3443 outputs LOW to turn OFF switch S1 and switch S2 until control circuit 34 restarts.

When switch S1 is turned OFF, current flowing through switch S1 is blocked, and thus current sampling signal Is1 and current sampling signal Is2 are almost zero, comparators CMP2 and CMP3 output LOW. Voltage sampling signal Vs1 is positive, and the signal on multi-function pin MUL reflects value of voltage sampling signal Vs1. Switch S1 and switch S2 are turned OFF, and the signal on multi-function pin MUL will not be passed to comparison circuit 343.

When switch S1 is turned OFF, the energy stored in transformer T1 is transferred to loads, e.g., LEDs. After the energy stored in transformer T1 is almost all transferred to loads, a magnetizing inductance of transformer T1 will be resonated with a parasitic capacitance of switch S1. In one embodiment, when the voltage across switch S1 (VDS) is resonated to valley, voltage sampling signal Vs1 is reduced to less than threshold signal Vth1, comparator CMP1 outputs HIGH to set flip-flop 3441, and thus AND gate 3443 outputs HIGH to turn ON switch S1 and switch S2.

In one embodiment, switch mode power supply 300 further comprises a diode D2 having an anode and a cathode. The anode of diode D2 is coupled to the output terminal of current sampling circuit 33, the cathode of diode D2 is coupled to multi-function pin MUL. When switch S1 is turned OFF, diode D2 prevents any current flowing from voltage sampling circuit 32 to current sampling circuit 33.

In one embodiment, control circuit 34 further comprises a filter coupled between the second terminal of switch S2 and the inverting terminal of comparator CMP2 to filter out a voltage spike caused by switching of switch S2. In one embodiment, the filter comprises a resistor R8 and a capacitor C1. A current source 11 paralleled with capacitor C1 may further be employed to discharge capacitor C1 when switch S2 is turned OFF. Otherwise, over-current protection may be triggered by mistaken because of accumulated charge and increased voltage on capacitor C1. Current source 11 may be configured to provide a small discharge current, for example, 100 nA.

In one embodiment, switch mode power supply 300 further comprises a voltage sampling circuit 309. Voltage sampling circuit 309 is coupled to the output terminal of the bridge rectified, and is configured to provide a voltage sampling signal Vs2 indicating the rectified input signal. In one embodiment, voltage sampling circuit 309 comprises a resistor divider comprising resistor R6 and resistor R7. Control circuit 34 further comprises a current averaging circuit 346, an amplifier 348 and a multiplier 347. Current averaging circuit 346 is coupled to current sampling circuit 35 to receive current sampling signal Is2 and current averaging circuit 346 is configured to provide an average current signal Iave. Amplifier 348 comprises an inverting terminal coupled to current averaging circuit 346 to receive average current signal Iave, a non-inverting terminal configured to receive a reference signal Vref, and an output terminal configured to provide a compensation signal COMP. In one embodiment, reference signal Vref is about 0.4V. In one embodiment, a capacitor C2 is employed to be coupled between compensation signal COMP and the system ground. Multiplier 347 comprises a first input terminal coupled to the output terminal of amplifier 346, a second input terminal coupled to voltage sampling circuit 309 to receive voltage sampling signal Vs2, and an output terminal configured to provide threshold signal Vth3 by multiplying compensation signal COMP with voltage sampling signal Vs2. Threshold signal Vth3 is configured to control the current flowing through the LEDs to implement high power factor (PF). In one embodiment, an average current Io flowing through the LEDs is about N*Vref/2*R5, where N is a turns ratio between the primary winding and the secondary winding of transformer T1.

In one embodiment, switch mode power supply 300 can be employed for LED driving device to drive the LED.

Figure 4:
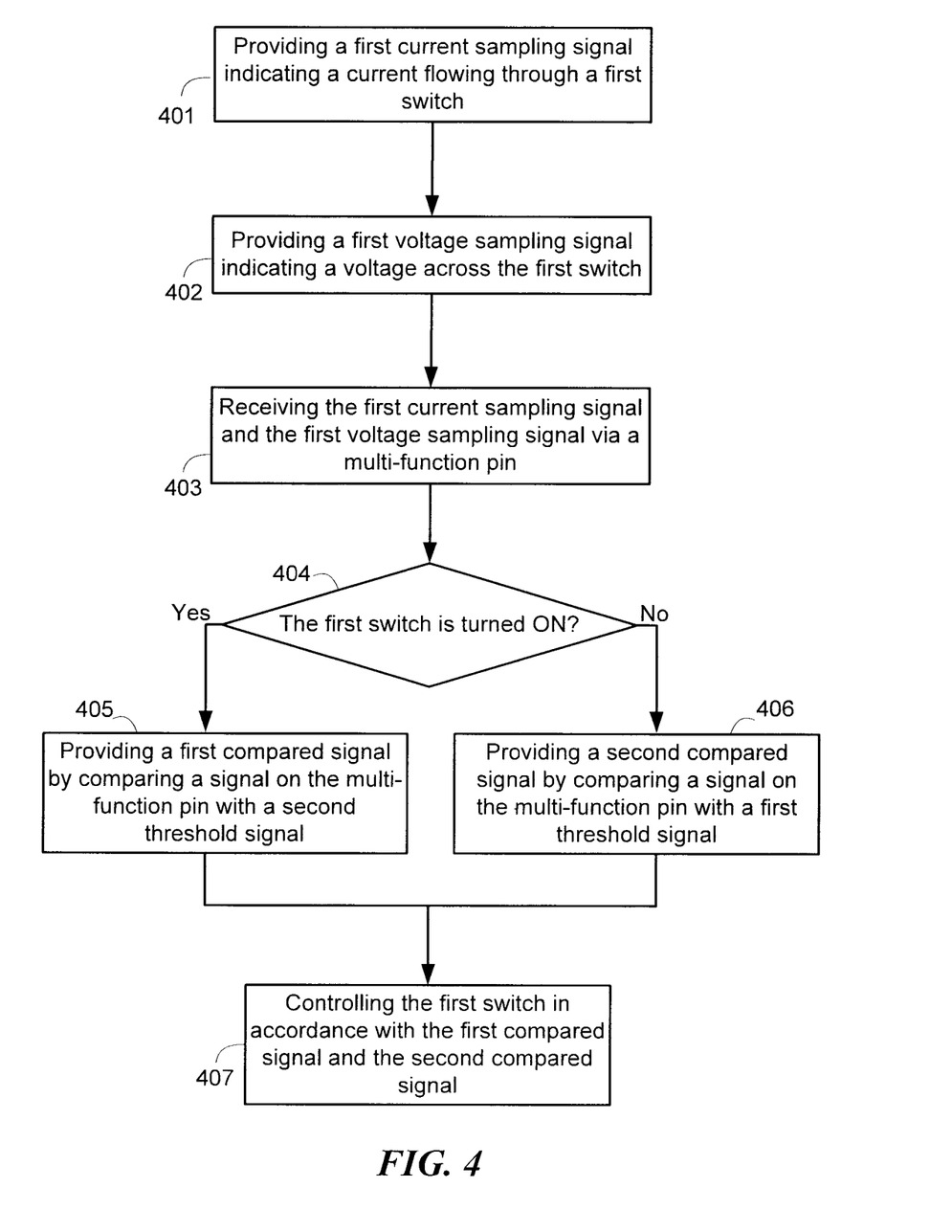
FIG. 4 is a flow chart illustrating a control method for switch mode power supply in accordance with an embodiment of the present invention.

FIG. 4 is a flow chart illustrating a control method for switch mode power supply in accordance with an embodiment of the present invention. The control method comprises stages 401-407.

At stage 401, providing a first current sampling signal indicating a current flowing through a first switch.

At stage 402, providing a first voltage sampling signal indicting a voltage across the first switch.

At stage 403, receiving the first current sampling signal and the first voltage sampling signal via a multi-function pin.

At stage 404, judging whether the first switch is turned ON. If the first switch is turned ON, then switching to stage 405, otherwise if the first switch is turned OFF, then switching to stage 406.

At stage 405, comparing a signal on the multi-function pin with a second threshold signal.

At stage 406, comparing the signal on the multi-function pin with a first threshold signal.

At stage 407, controlling the first switch in accordance with a comparing result of stage 405 or stage 406. In one embodiment, when the first switch is OFF, if the signal on the multi-function pin is less than the first threshold signal, the first switch is configured to be turned ON. In one embodiment, when the first switch is ON, if the signal on the multi-function pin is larger than the second threshold signal, an over-current protection is triggered, e.g., turning OFF the first switch.

In one embodiment, the control method further comprises providing a second current sampling signal indicating the current flowing through the first switch, comparing the second current sampling signal with a third threshold signal, and turning OFF the first switch if the second current sampling signal is larger than the third threshold signal.

In one embodiment, the control method further comprises proving a second voltage sampling signal indicating a rectified input signal of the switch mode power supply, providing an average signal in accordance with the second current sampling signal, proving a compensation signal in accordance with the average signal and a reference signal, and providing the third threshold signal by multiplying the rectified input signal with the compensation signal.

The above description and discussion about specific embodiments of the present technology is for purposes of illustration. However, one with ordinary skill in the relevant art should know that the invention is not limited by the specific examples disclosed herein. Variations and modifications can be made on the apparatus, methods and technical design described above. Accordingly, the invention should be viewed as limited solely by the scope and spirit of the appended claims.

We claim:

1. A switch mode power supply, comprising:
a first switch having a first terminal, a second terminal and a control terminal;
an energy storage component having a first terminal and a second terminal, wherein the second terminal is coupled to the first terminal of the first switch, and wherein the energy storage component is configured to store energy when the first switch is turned ON and the energy storage component is configured to output energy when the first switch is turned OFF;
a first current sampling circuit having an input terminal and an output terminal, wherein the input terminal is coupled to the second terminal of the first switch, and the output terminal is configured to provide a first current sampling signal indicating a current flowing through the first switch from the first terminal of the first switch to the second terminal of the first switch;
a first voltage sampling circuit having an input terminal and an output terminal, wherein the input terminal is configured to sample a voltage on the first terminal of the first switch, and the output terminal is configured to provide a first voltage sampling signal indicating a voltage across the first switch; and
a control circuit having a first input terminal and an output terminal, wherein the first input terminal is coupled to the output terminal of the first current sampling circuit and the output terminal of the first voltage sampling circuit via a multi-function pin, and the output terminal is configured to provide a control signal coupled to the control terminal of the first switch; wherein
the control circuit is configured to provide a first comparing signal by comparing a signal on the multi-function pin with a first threshold signal when the first switch is turned OFF;
the control circuit is configured to provide a second comparing signal by comparing the signal on the multi-function pin with a second threshold signal when the first switch is turned ON; and wherein
the control circuit is configured to provide the control signal responsive to the first comparing signal and the second comparing signal.

2. The switch mode power supply of claim 1, wherein the control circuit comprises:
a signal transmission circuit having an input terminal, a control terminal, a first output terminal and a second output terminal, wherein the input terminal is coupled to the multi-function pin, and the control terminal is configured to receive the control signal;
a first comparison circuit having a first input terminal, a second input terminal and an output terminal, wherein the first input terminal is coupled to the first output terminal of the signal transmission circuit, the second input terminal is configured to receive the first threshold signal;
a second comparison circuit having a first input terminal, a second input terminal and an output terminal, wherein the first input terminal is coupled to the second output terminal of the signal transmission circuit, the second input terminal is configured to receive the second threshold signal; and a logic circuit having a first input terminal, a second input terminal and an output terminal, wherein the first input terminal is coupled to the output terminal of the first comparison circuit, the second input terminal is coupled to the output terminal of the second comparison circuit, and the output terminal is coupled to the output terminal of the control circuit to provide the control signal.

3. The switch mode power supply of claim 2, wherein the signal transmission circuit is configured to transmit the signal on the multi-function pin to the first input terminal of the first comparison circuit when the first switch is turned OFF, and the signal transmission circuit is configured to transmit the signal on the multi-function pin to the first input terminal of the second comparison circuit when the first switch is turned ON.

4. The switch mode power supply of claim 2, wherein the signal transmission circuit comprises a second switch having a first terminal, a second terminal and a control terminal, wherein the first terminal is coupled to the multi-function pin, the second terminal is coupled to the first input terminal of the second comparison circuit, and the control terminal is coupled to the output terminal of the logic circuit to receive the control signal.

5. The switch mode power supply of claim 1, wherein a fan-out capability of the first current sampling circuit is larger than a fan-out capability of the first voltage sampling circuit.

6. The switch mode power supply of claim 1, further comprising a second current sampling circuit having an input terminal and an output terminal, wherein the input terminal is coupled to the second terminal of the first switch, and wherein the output terminal is configured to provide a second current sampling signal indicating the current flowing through the first switch from the first terminal of the first switch to the second terminal of the first switch.

7. The switch mode power supply of claim 6, wherein the first switch is turned OFF when the second current sampling signal is larger than a third threshold signal, and the first switch is turned ON when the first voltage sampling signal is less than the first threshold signal, and wherein an overcurrent protection is provided when the first current sampling signal is larger than the second threshold signal.

8. The switch mode power supply of claim 6, wherein the control circuit further comprises:
a second input terminal, coupled to the output terminal of the second current sampling circuit;
a second switch having a first terminal, a second terminal and a control terminal, wherein the first terminal is coupled to the multi-function pin;
a first comparison circuit having a first input terminal, a second input terminal and an output terminal, wherein the first input terminal is coupled to the first terminal of the second switch, and the second input terminal is configured to receive the first threshold signal;
a second comparison circuit having a first input terminal, a second input terminal and an output terminal, wherein the first input terminal is coupled to the second terminal of the second switch, and the second input terminal is configured to receive the second threshold signal;
a third comparison circuit having a first input terminal, a second input terminal and an output terminal, wherein the first input terminal is configured to receive the second current sampling signal, and the second input terminal is configured to receive a third threshold signal; and a logic circuit having a first input terminal, a second input terminal, a third input terminal and an output terminal, wherein the first input terminal is coupled to the output terminal of the first comparison circuit, the second input terminal is coupled to the output terminal of the second comparison circuit, the third input terminal is coupled to the output terminal of the third comparison circuit, and the output terminal is coupled to the output terminal of the control circuit to provide the control signal.

9. The switch mode power supply of claim 8, further comprising:
an input port configured to receive an input signal;
a rectified circuit having an input terminal coupled to the input port, and an output terminal coupled to the first terminal of the energy storage component to provide a rectified input signal; and
a second voltage sampling circuit having an input terminal and an output terminal, wherein the input terminal is coupled to the output terminal of the rectified circuit, and the output terminal is configured to provide a second voltage sampling signal indicating a voltage of the rectified input signal;
wherein the control circuit further comprising:
a current averaging circuit having an input terminal and an output terminal, wherein the input terminal is coupled to the output terminal of the second current sampling circuit, and the output terminal is configured to provide an average current signal;
an amplifying circuit having an inverting terminal, a non-inverting terminal and an output terminal, wherein the inverting terminal is coupled to the output terminal of the current averaging circuit to receive the average current signal, the non-inverting terminal is coupled to a reference signal, and the output terminal is configured to provide a compensation signal; and
a multiplier having a first input terminal, a second input terminal and an output terminal, wherein the first input terminal is coupled to the output terminal of the amplifying circuit to receive the compensation signal, the second input terminal is coupled to the output terminal of the second voltage sampling circuit to receive the second voltage sampling signal, and the output terminal is configured to provide the third threshold voltage by multiplying the second voltage sampling signal with the compensation signal.

10. The switch mode power supply of claim 8, wherein the control circuit is integrated onto an integrated circuit.

11. The switch mode power supply of claim 1, further comprising a diode having an anode and a cathode, wherein the anode is coupled to the output terminal of the first current sampling circuit and the cathode is coupled to the first input terminal of the control circuit.

12. A control circuit for a switch mode power supply comprising a first switch, the control circuit comprising:
a multi-function pin, coupled to receive a first current sampling signal indicating a current flowing through the first switch and a first voltage sampling signal indicting a voltage across the first switch;
a first comparison circuit, having a first input terminal, a second input terminal and an output terminal, wherein the first input terminal is coupled to the multi-function pin, and the second input terminal is configured to receive a first threshold signal;
a second comparison circuit, having a first input terminal, a second input terminal and an output terminal, wherein the first input terminal is selectively coupled to the multi-function pin, and the second input terminal is configured to receive a second threshold signal;

a logic circuit having a first input terminal, a second input terminal and an output terminal, wherein the first input terminal is coupled to the output terminal of the first comparison circuit, the second input terminal is coupled to the output terminal of the second comparison circuit, and the output terminal is configured to provide a control signal, and wherein the control signal is configured to control the first switch, and wherein the logic circuit is configured to turn ON the first switch when the first voltage sampling signal is less than the first threshold signal, and wherein the logic circuit is configured to provide an over-current protection when the first current sampling signal is larger than the second threshold signal; and a signal transmission circuit having an input terminal, a control terminal, a first output terminal and a second output terminal, wherein the input terminal is coupled to the multi-function pin, the control terminal is coupled to the output terminal of the logic circuit to receive the control signal, the first output terminal is coupled to the first input terminal of the first comparison circuit, and the second output terminal is coupled to the first input terminal of the second comparison circuit.

13. The control circuit of claim 12, wherein the signal transmission circuit comprises a second switch, wherein the second switch comprising:

a first terminal, coupled to the multi-function pin;

a second terminal, coupled to the first input terminal of the second comparison circuit; and a control terminal, coupled to the output terminal of the logic circuit to receive the control signal.

14. The control circuit of claim 12, further comprising:

a second current sampling signal indicating the current flowing through the first switch; and a third comparison circuit, having a first input terminal, a second input terminal and an output terminal, wherein the first input terminal is configured to receive the second current sampling signal, and wherein the second input terminal is configured to receive a third threshold signal;

wherein the logic circuit further comprises a third input terminal coupled to the output terminal of the third comparison circuit, and wherein the logic circuit is configured to turn OFF the first switch when the second current sampling signal is larger than the third threshold signal.

15. The control circuit of claim 14, further comprising:

a current averaging circuit having an input terminal and an output terminal, wherein the input terminal is configured to receive the second current sampling signal, and the output terminal is configured to provide an average current signal;

an amplifying circuit having an inverting terminal, a non-inverting terminal and an output terminal, wherein the inverting terminal is coupled to the output terminal of the current averaging circuit to receive the average current signal, the non-inverting terminal is configured to receive a reference signal, and the output terminal is configured to provide a compensation signal; and a multiplier having a first input terminal, a second input terminal and an output terminal, wherein the first input terminal is coupled to the output terminal of the amplifying circuit to receive the compensation signal, the second input terminal is configured to receive the second voltage sampling signal, and the output terminal is configured to provide the third threshold voltage by multiplying the second voltage sampling signal with the compensation signal.

16. The control circuit of claim 15, wherein the control circuit is integrated onto an integrated circuit.

17. A control method for controlling a switch mode power supply comprising a first switch, the method comprising:

providing a first current sampling signal, wherein the first current sampling signal is configured to indicate a current flowing through the first switch;

providing a first voltage sampling signal, wherein the first voltage sampling signal is configured to indicate a voltage across the first switch;

receiving the first current sampling signal and the first voltage sampling signal via a multi-function pin;

providing a first comparing signal by comparing a signal on the multi-function pin with a first threshold signal when the switch is turned OFF;

providing a second comparing signal by comparing a signal on the multi-function pin with a second threshold signal when the switch is turned ON; and controlling the first switch in accordance with the first comparing signal and the second comparing signal.

18. The control method of claim 17, further comprising:

providing a second current sampling signal, wherein the second current sampling signal is configured to indicate current flowing through the first switch;

comparing the second current sampling signal with a third threshold signal; and turning OFF the first switch when the second current sampling signal is larger than the third threshold signal.

19. The control method of claim 18, further comprising:

providing a second voltage sampling signal, wherein the second voltage sampling signal is configured to indicate a rectified input signal of the switch mode power supply;

providing an average current signal in accordance with the second current sampling signal;

providing a compensation signal in accordance with the average current signal and a reference signal; and providing the third threshold signal by multiplying the second voltage sampling signal with the compensation signal.

* * * * *